Patented Nov. 28, 1922.

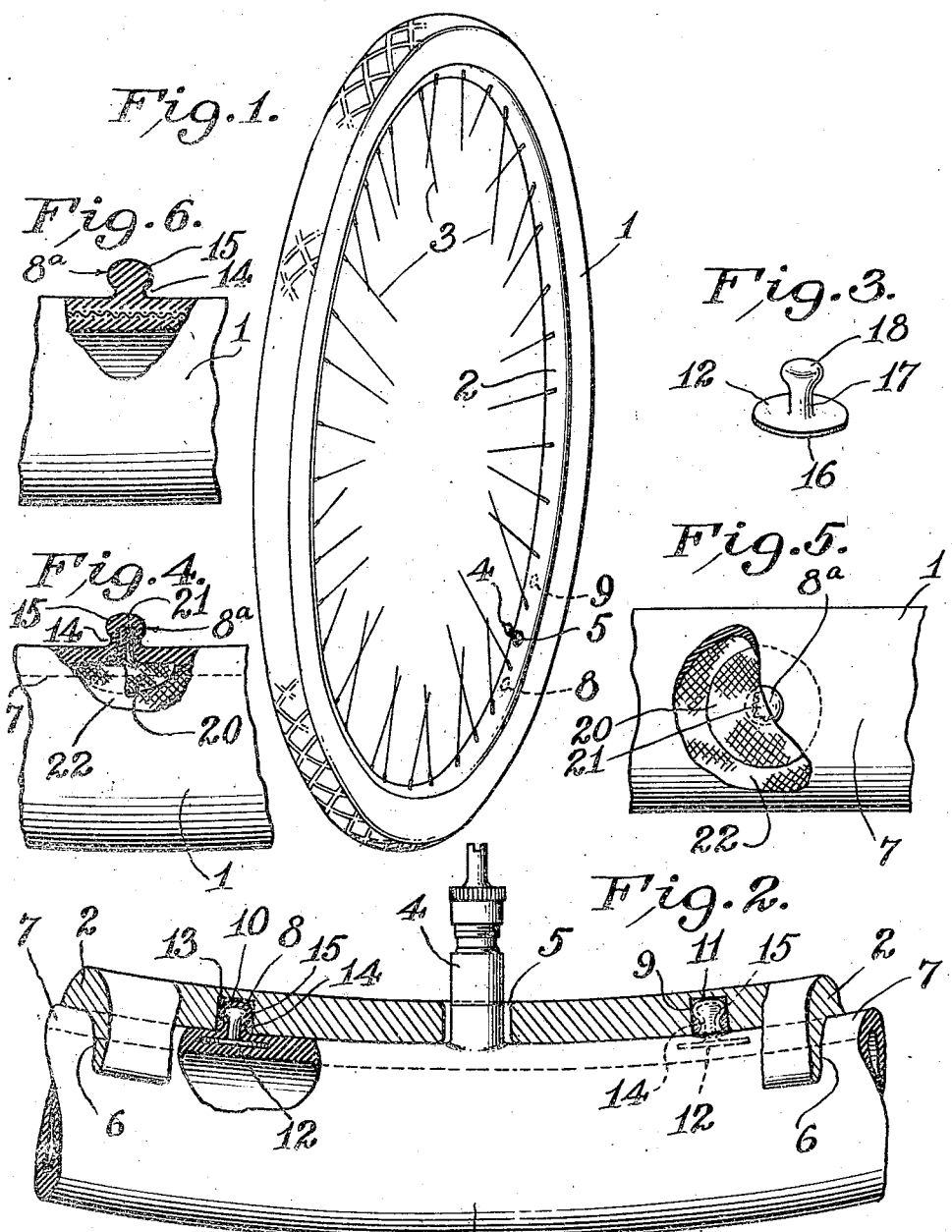

1,437,154

UNITED STATES PATENT OFFICE.

HARRY F. SCHNELL, OF IRVINGTON, NEW JERSEY.

TIRE AND RIM FOR VEHICLES.

Application filed December 13, 1921. Serial No. 521,998.

*To all whom it may concern:*

Be it known that I, HARRY F. SCHNELL, a citizen of the United States of America, residing at Irvington, county of Essex, State of New Jersey, have invented certain new and useful Improvements in Tires and Rims for Vehicles, of which the following is a specification.

This invention relates to improvements in tires and rims for vehicles.

An object of this invention is to provide a construction of the tire and of the rim whereby the tire is positively insured against displacement relative to the rim, and whereby the valve stem of the tire is relieved of undue strain or rupture.

A preferred form of carrying out my invention is to provide one or more recesses in the outer concave annular face of the rim respectively on opposite sides of the perforation in the rim through which the valve stem projects, and to secure integrally to the inward face of the pneumatic tire projections corresponding to and extending into the aforesaid recesses.

The inward annular portion of the tire is preferably coated with suitable cement for adhering to the outward annular face of the rim. Such projections may be made of rubber or rubber fabric molded integrally with the body of the pneumatic tire or may be formed of a suitable metal reinforcing element inserted during the stage of molding the pneumatic tire body and covered with rubber.

Further features and objects of the invention will be more fully understood from the following description and the accompanying drawings, in which—

Fig. 1 is a perspective view of a wire-spoke wheel having its rim and tire constructed and arranged in accordance with my invention.

Fig. 2 is a detail side elevation of one modified form of my invention showing the pneumatic tire, partly broken away, and of a portion of the rim, partly broken away on central section, the aforesaid being shown in enlarged view;

Fig. 3 is a detail perspective view of a metal insert employed in the modification shown in Fig. 2;

Fig. 4 is a detail side elevation, partly broken away in central section, of a second modification;

Fig. 5 is a detail top plan view of a further modification; and

Fig. 6 is a side elevation of a still further modification partly broken away in central section.

Referring to the construction shown in Figs. 1 and 2, the hollow body usually of rubber or rubber fabric of the pneumatic tire proper is indicated at 1, shown mounted on the rim 2 usually of wood. The rim 2 may be mounted on the hub, not shown, by means of the wire spokes 3 in accordance with the usual practice, or otherwise, as may be desired.

The stem of the valve of the pneumatic tire 1 is indicated at 4 and projects through the perforation 5 in the rim 2.

As appears in enlarged view in Fig. 2, the rim 2 is concaved on its outer face 6 of a curvature corresponding to the curvature of the inward face 7 of the pneumatic tire body 1, and any approved form of cement is applied to the face of the tire body 1 for adhesion to the concaved face 6 of the rim 2.

On opposite sides of the valve stem 4, I provide the projections 8, 9 extending integrally from or otherwise fixedly secured to the body 1 of the pneumatic tire and respectively projecting within the preferably bottomed recesses 10, 11. The locations of the projections 8, 9 are indicated in dotted outline in Fig. 1.

By the provision of such projections, 8, 9, within the recesses 10, 11 and on opposite sides of the valve stem 4, preferably aided by the adhesion secured by the cement between the inward convex face 7 of the tire body 1 and the outward concaved face 6 of the rim 2, the body of the pneumatic tire 1 is ensured against displacement relative to the rim 2. Such function exercised by the projections 8, 9, in coaction with the recesses 10, 11 respectively is obtained in the event that the cement between the tire body 1 and the rim 2 becomes ineffective or is improperly applied or improperly "conditioned."

Such mechanical locking between the body of the tire and the rim, precludes the stem 4 of the valve encountering the faces of the perforation 5 and accordingly relieves the valve stem 4 of any strain or possible rupture.

Such projections 8, 9 may be formed as is indicated in Fig. 2 or as indicated in Figs. 4 and 5, and 6 showing various modifications.

In the modification shown in Figs. 2 and 3, the metal insert 12 is suitably located within the mold in which the tire body is molded and an outer thickness of rubber composition 13 formed in the molding process.

Preferably, such thickness 13 is of reduced diameter at the inwardly disposed location 14 and of enlarged diameter at the outwardly disposed location 15 to provide for a resilient frictional binding between the projection 8 and the walls of the recess 10.

The metal insert is shown enlarged in Fig. 3 and may comprise the circular disk 16 from which extends the shank 17 having the enlarged rounded head 18.

The projection 9 in the modification shown in Figs. 2 and 3, is constructed and arranged similar to the projection 8 and like parts are designated by like reference numbers.

In the modification shown in Fig. 4, the projection 8$^a$ is formed of rubber or rubber fabric and without any metal insert element and is provided with the inwardly disposed reduced diametrical portion 14 and outwardly disposed enlarged diametrical portion 15. In this modification, the fabric 20 of the body of the pneumatic tire 1 may be extended at 21 within the body of the projection 8$^a$.

In the modification shown in Fig. 5, the projection 8$^a$ is formed of rubber composition and is covered exteriorly of the hollow projection 8$^a$ by the fabric 22. The fabric 22 preferably extends in molded engagement with the inward face 7 of the tire body 1, for strengthening purposes, as will be understood by those skilled in the art.

Fig. 6 shows a further modification in which the projection 8$^a$ is formed wholly of rubber composition, preferably molded integrally with the body 1 of the tire during the stage of molding. As is indicated in Fig. 6, such projection 8$^a$ is of reduced diameter at the inwardly disposed location 14 and of enlarged diameter at the outwardly disposed location 15.

From the above, it will be observed that my invention provides for the elimination of a high percentage of tire troubles, by the provision of simple and reliable means for preventing "creeping" of the tire about the rim and thereby preventing the distortion and possible rupture of the valve stem.

Whereas I have described my invention by reference to several specific forms as to the manner of forming and shaping the projections of the tire body, and as to the recesses in the rim for such projections, it will be understood that many changes and modifications may be made without departing from the spirit of the invention, as defined by the appended claims.

I claim.

1. The combination with a rim having an outwardly concaved face provided with a perforation and further provided with a plurality of bottomed recesses opening on said outward concaved face, of a pneumatic annular tire body secured on its inward convex face by a suitable cement substance to said outward concave face, and a plurality of projections of rubber and integral with said inward face of said tire body and extending respectively within said bottomed recesses, each of said projections being of reduced diameter at an inward location and of enlarged diameter at an outward location to provide for resilient binding engagement with the sides of its recess.

2. The combination of a rim provided with a perforation and having two bottomed, substantially cylindrical recesses respectively on opposite sides of said perforation, an inflatable tire tube having a valve stem extending through said perforation and two projections integral with the body of said tire tube and respectively extending into said recesses, each of said projections being substantially spherical and enlarged at its end to frictionally bind the projection within its recess.

3. The combination of a rim provided with a perforation and having two bottomed, substantially cylindrical recesses respectively on opposite sides of said perforation, an inflatable tire tube having a valve stem extending through said perforation and two projections integral with the body of said tire tube and respectively extending into said recesses, each of said projections being substantially spherical and enlarged at its end to frictionally bind the projection within its recess and a non-resilient, re-inforcing element extending from the body of the tire tube interiorly of each projection.

In testimony whereof I have signed this specification this 1st day of November, 1921.

HARRY F. SCHNELL.